US010356765B2

United States Patent
Kim et al.

(10) Patent No.: US 10,356,765 B2
(45) Date of Patent: Jul. 16, 2019

(54) METHOD FOR REPORTING CHANNEL STATUS INFORMATION IN WIRELESS COMMUNICATION SYSTEM AND DEVICE FOR SAME

(71) Applicant: LG ELECTRONICS INC., Seoul (KR)

(72) Inventors: Hyungtae Kim, Seoul (KR); Kijun Kim, Seoul (KR); Jonghyun Park, Seoul (KR); Daesung Hwang, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/741,583

(22) PCT Filed: Jul. 8, 2016

(86) PCT No.: PCT/KR2016/007435
§ 371 (c)(1),
(2) Date: Jan. 3, 2018

(87) PCT Pub. No.: WO2017/014463
PCT Pub. Date: Jan. 26, 2017

(65) Prior Publication Data
US 2018/0206223 A1    Jul. 19, 2018

Related U.S. Application Data

(60) Provisional application No. 62/195,278, filed on Jul. 21, 2015, provisional application No. 62/199,242, filed on Jul. 31, 2015.

(51) Int. Cl.
*H04W 72/04* (2009.01)
*H04W 28/06* (2009.01)
(Continued)

(52) U.S. Cl.
CPC ....... *H04W 72/0413* (2013.01); *H04W 28/06* (2013.01); *H04W 72/044* (2013.01); *H04B 7/0417* (2013.01); *H04W 88/02* (2013.01)

(58) Field of Classification Search
CPC ............. H04W 72/0413; H04W 28/06; H04W 72/044; H04W 88/02; H04B 7/0417
See application file for complete search history.

(56) References Cited

U.S. PATENT DOCUMENTS

2013/0121270 A1    5/2013 Chen et al.
2013/0208665 A1*   8/2013 Baldemair ............ H04L 1/0031
                                                   370/329

(Continued)

FOREIGN PATENT DOCUMENTS

WO    WO 2013/109073 A1    7/2013

*Primary Examiner* — Hashim S Bhatti
(74) *Attorney, Agent, or Firm* — Birch, Stewart, Kolasch & Birch, LLP

(57) ABSTRACT

Disclosed in the present application is a method for transmitting, by a terminal, uplink control information to a base station in a wireless communication system. In detail, the method includes the steps of: periodically transmitting, to a base station, first uplink control information including channel status information; and transmitting, to the base station, second unlink control information including response information to downlink data, wherein when the first uplink control information and the second uplink control information are transmitted at the same time, the channel status information is characterized in being included in the second uplink control information and the first uplink control information and the second uplink control information are characterized in being transmitted together with a first indicator for indicating whether the response information is included.

14 Claims, 13 Drawing Sheets

(a)

(b)

(51) Int. Cl.
*H04W 88/02* (2009.01)
*H04B 7/0417* (2017.01)

(56) References Cited

U.S. PATENT DOCUMENTS

| | | |
|---|---|---|
| 2014/0078942 A1 | 3/2014 | Noh et al. |
| 2014/0133439 A1 | 5/2014 | Yamada et al. |
| 2015/0016389 A1 | 1/2015 | Baldemair et al. |
| 2015/0245345 A1* | 8/2015 | Gao ............ H04L 1/1671 370/329 |
| 2016/0344515 A1* | 11/2016 | Aiba ............ H04L 1/1812 |

* cited by examiner

FIG. 2
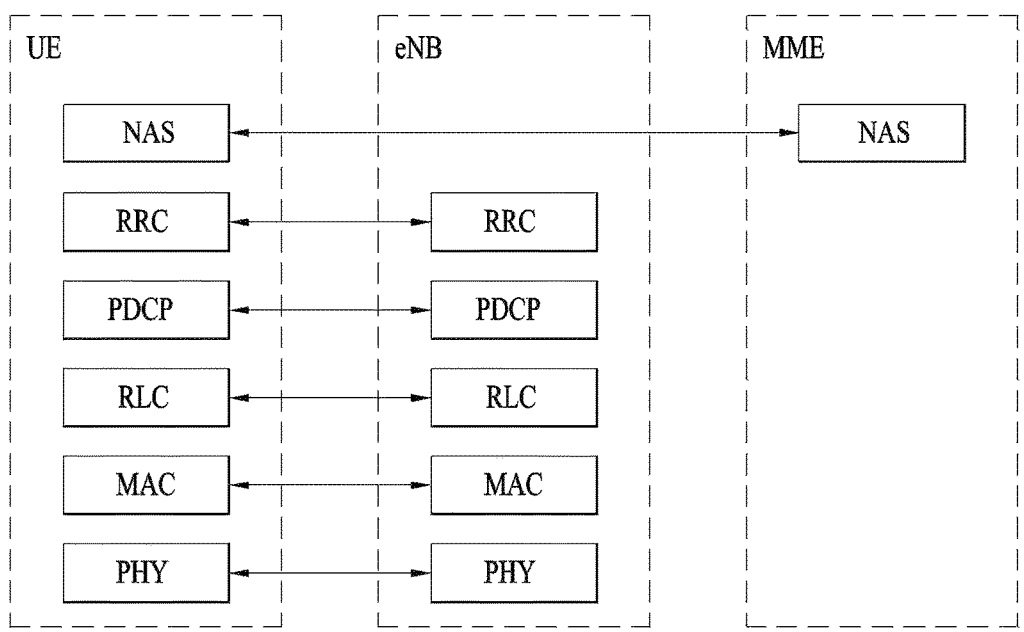
(a) CONTROL-PLANE PROTOCOL STACK
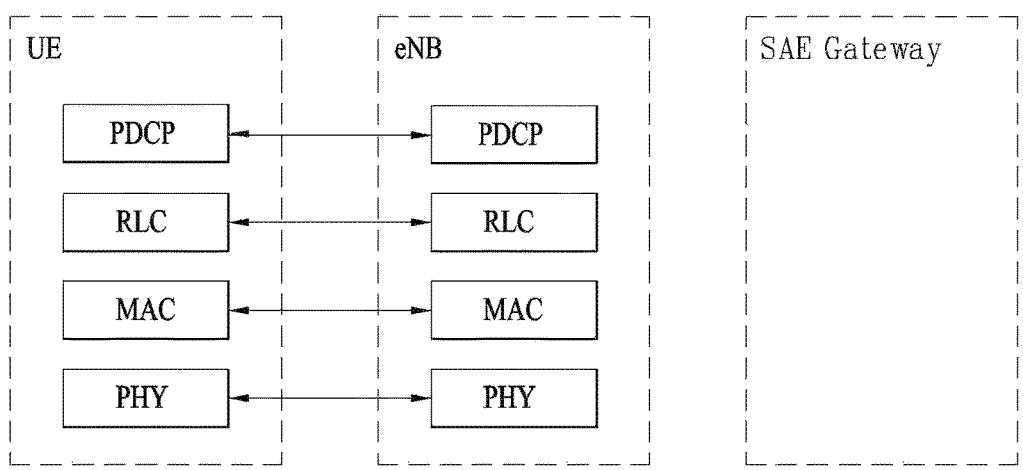
(b) USER-PLANE PROTOCOL STACK

METHOD FOR REPORTING CHANNEL STATUS INFORMATION IN WIRELESS COMMUNICATION SYSTEM AND DEVICE FOR SAME

CROSS REFERENCE TO RELATED APPLICATIONS

This application is the National Phase of PCT International Application No. PCT/KR2016/007435, filed on Jul. 8, 2016, which claims priority under 35 U.S.C. 119(e) to U.S. Provisional Application No. 62/195,278, filed on Jul. 21, 2015, and to U.S. Provisional Application No. 62/199,242, filed on Jul. 31, 2015, all of which are hereby expressly incorporated by reference into the present application.

TECHNICAL FIELD

The present invention relates to a wireless communication system, and more particularly, to a method of reporting channel state information in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to propose a method of reporting channel state information in a wireless communication system and apparatus therefor.

Technical Solutions

In one technical aspect of the present invention, provided herein is a method of transmitting uplink control information to a base station from a user equipment in a wireless communication system, including transmitting a first uplink control information including channel state information to the base station periodically and transmitting a second uplink control information including response information to downlink data to the base station, wherein if the first uplink control information and the second uplink control information are transmitted at a same timing, the channel state information is included in the second uplink control information and wherein the first uplink control information and the second uplink control information are transmitted together with a first indicator indicating whether the response information is included.

In another technical aspect of the present invention, provided herein is a user equipment in a wireless communication system, including a wireless communication module configured to transceive a signal with a base station and a processor configured to process the signal, wherein the processor is further configured to control the wireless communication unit to transmit a first uplink control information including channel state information to the base station periodically and to transmit a second uplink control information including response information to downlink data to the base station, wherein if the first uplink control information and the second uplink control information are transmitted at a same timing, the processor controls the channel state information to be included in the second uplink control information and wherein the first uplink control information and the second uplink control information are transmitted together with a first indicator indicating whether the response information is included.

Preferably, the first uplink control information and the second uplink control information may include a second indicator indicating a bundling pattern applied to the response information.

Additionally, if a remaining capacity amounting to a size of the channel state information exists in the second uplink control information, the channel state information may be included in the second uplink control information. Moreover, if a remaining capacity amounting to a size of the channel state information does not exist in the second uplink control information, the channel state information may be dropped.

More preferably, the first indicator is included in a reference signal transmitted together with the first uplink control information and the second uplink control information. Or, MSB (most significant bit) in payload of the first uplink control information and the second uplink control information may be the first indicator.

Additionally, a size of the first uplink control information may be equal to that of the second uplink control information.

Advantageous Effects

According to an embodiment of the present invention, a user equipment can report channel state information more efficiently in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification.

BEST MODE FOR INVENTION

Figure 1:
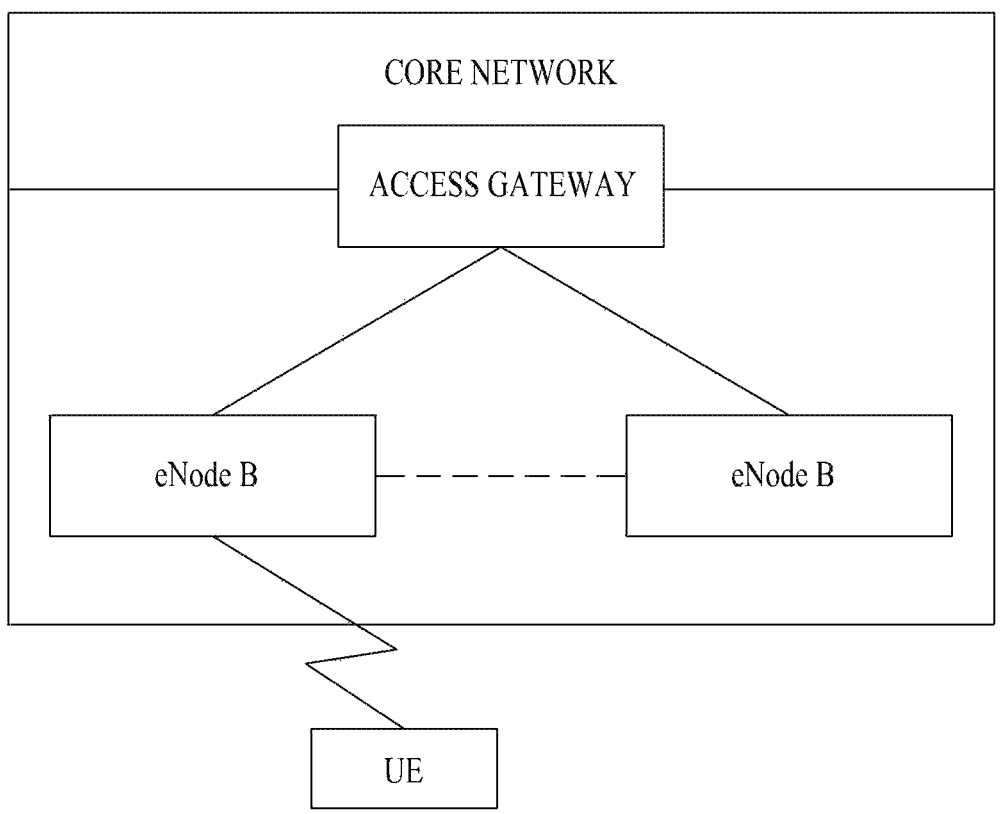
FIG. 1 is a diagram schematically illustrating a network structure of an evolved universal mobile telecommunications system (E-UMTS) as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
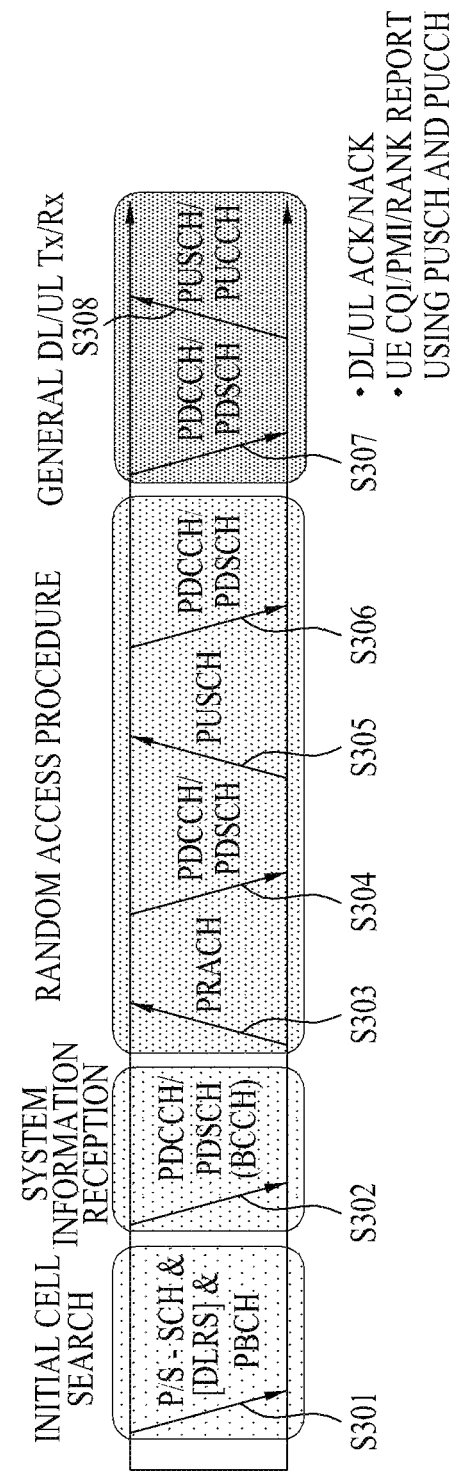
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
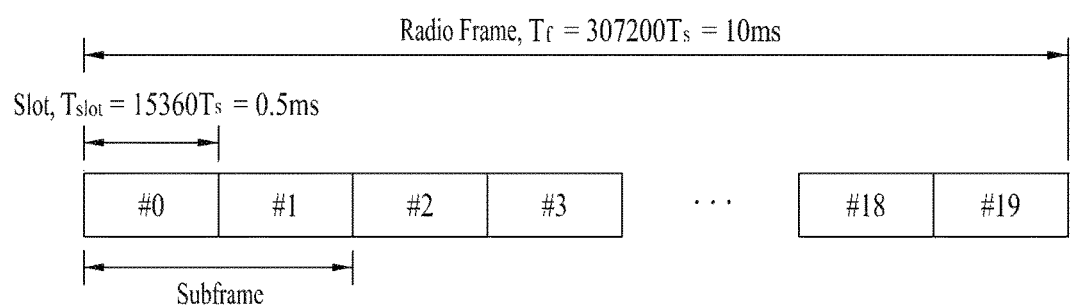
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by $Ts=1/(15\ kHz \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
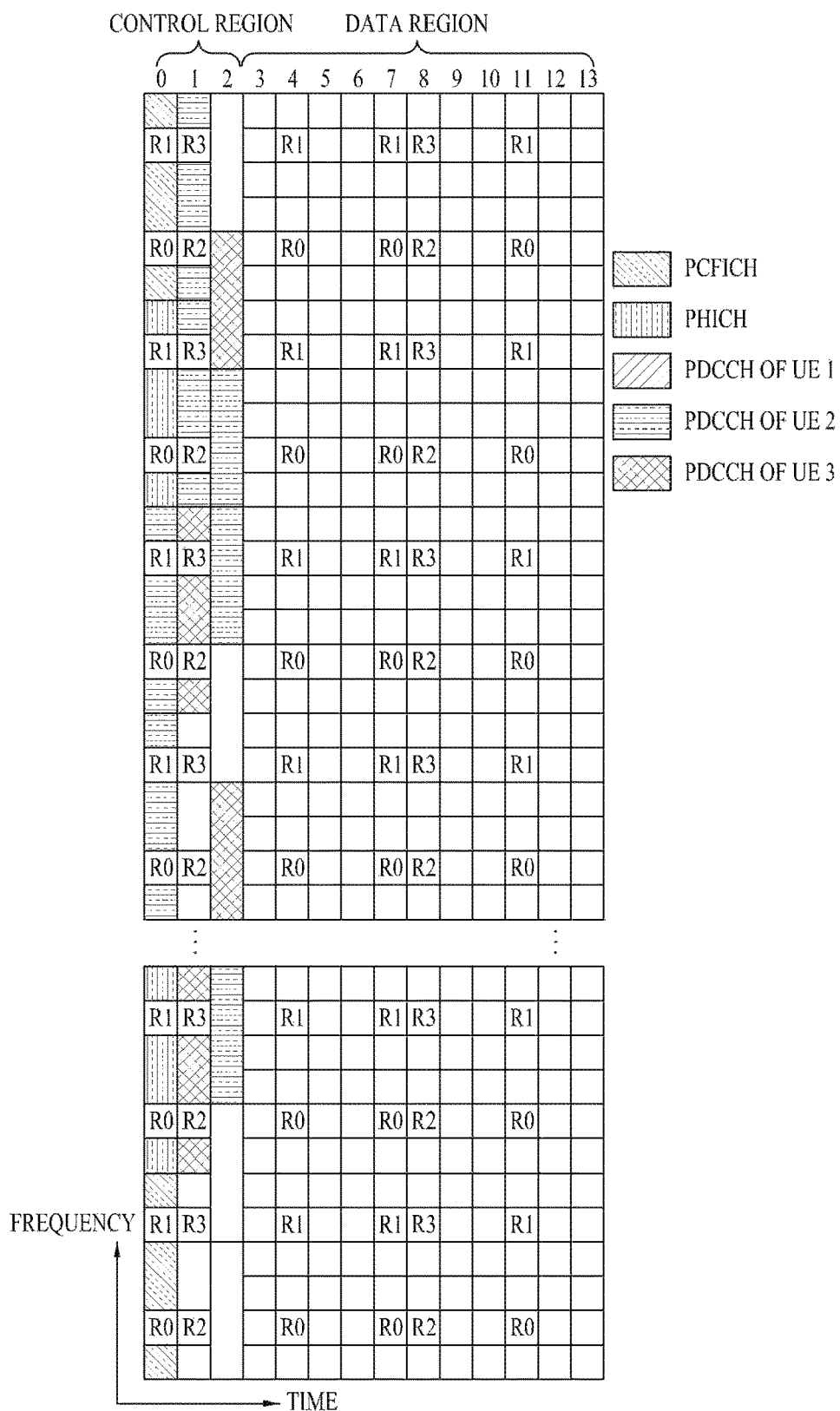
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
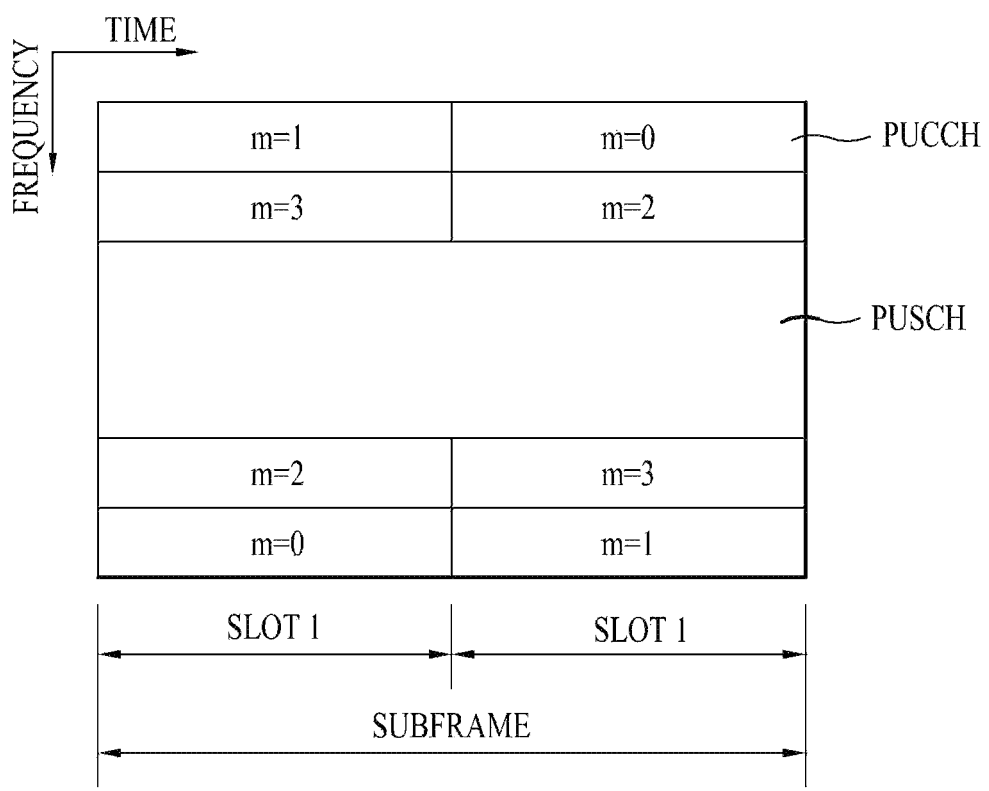
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

PUCCH can be used to transmit the following control information.

SR (scheduling request): This is the information used to request uplink UL-SCH resource. This is transmitted using OOK (on-off keying) scheme.

HARQ-ACK: This is a response to DL data packet (e.g., codeword) on PDSCH. This indicates whether DL data packet is successfully received. In response to a single DL codeword, HARQ-ACK 1 bit is transmitted. In response to two DL codewords, HARQ-ACK 2 bits are transmitted. HARQ response includes positive ACK (simply, ACK), negative ACK (NACK), DTX or NACK/DTX. Here, HARQ-ACK is interchangeably used with HARQ ACK/NACK or ACK/NACK.

CSI (channel state information): This is feedback information of a DL channel. MIMO (multiple input multiple output)-related feedback information includes RI (rank indicator) and PMI (precoding matrix indicator). 20 bits are used per subframe.

A quantity of control information (UCI) that can be transmitted in a subframe by a UE depends on the number of SC-FDMA available for control information transmission. The SC-FDMA available for control information transmission means SC-FDMA symbols remaining after excluding SC-FDMA symbols for reference signal transmission in a subframe. In case of SRS (sounding reference signal) configured subframe, a last SC-FDAM symbol of the subframe is excluded as well. A reference signal is used for coherent detection of PUCCH. The PUCCH supports various formats are according to the transmitted information.

Table 1 shows mapping relation between PUCCH format and UCI in LTE system.

TABLE 1

| PUCCH Format | Uplink Control Information (UCI) |
|---|---|
| Format 1 | SR (scheduling request) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1- or 2-bit HARQ ACK/NACK (20 bits) (Extended CP corresponds only) |
| Format 2a | CSI and 1-bit HARQ ACK/NACK ((20 + 1) coded bits) |
| Format 2b | CSI and 2-bit HARQ ACK/NACK ((20 + 2) coded bits) |
| Format 3 (LTE-A) | Maximum 24-bit HARQ ACK/NACK + SR |

Figure 7:
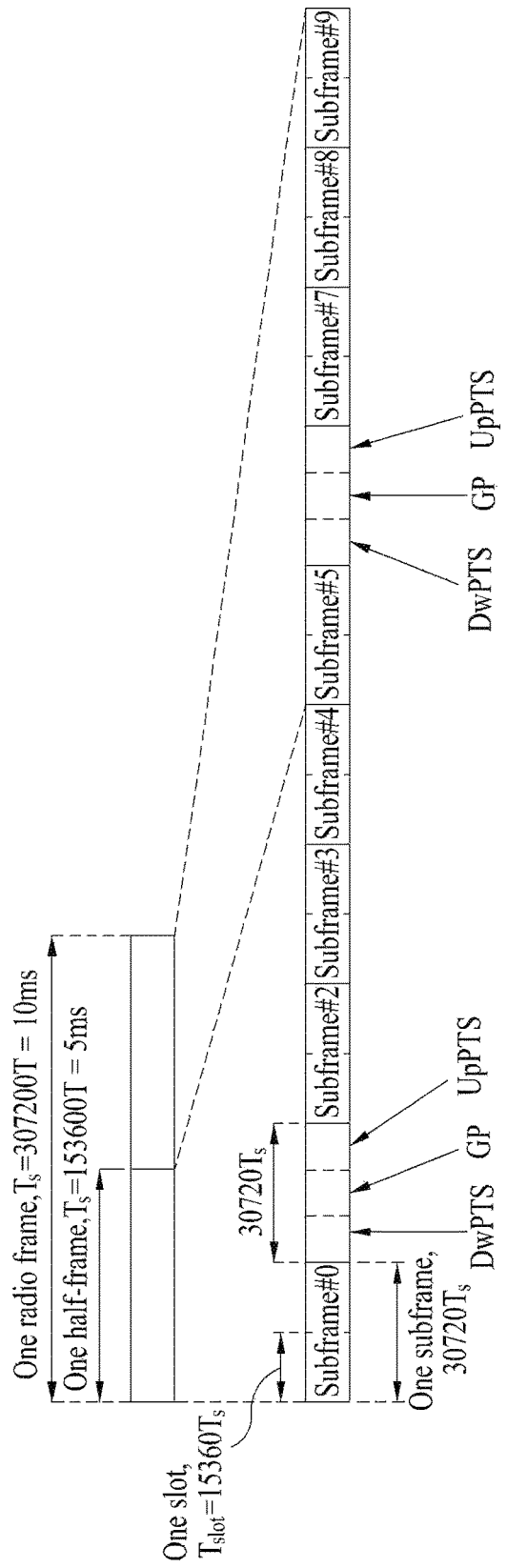
FIG. 7 illustrates a structure of a radio frame in an LTE TDD system.

FIG. 7 illustrates a structure of a radio frame in an LTE TDD system.

Referring to FIG. 7, in the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D, U, and S refer to a downlink subframe, an uplink subframe, and the special subframe. In addition, Table 2 also shows downlink-to-uplink switch-point periodicity in an uplink/downlink subframe configuration in each system.

Figure 8:
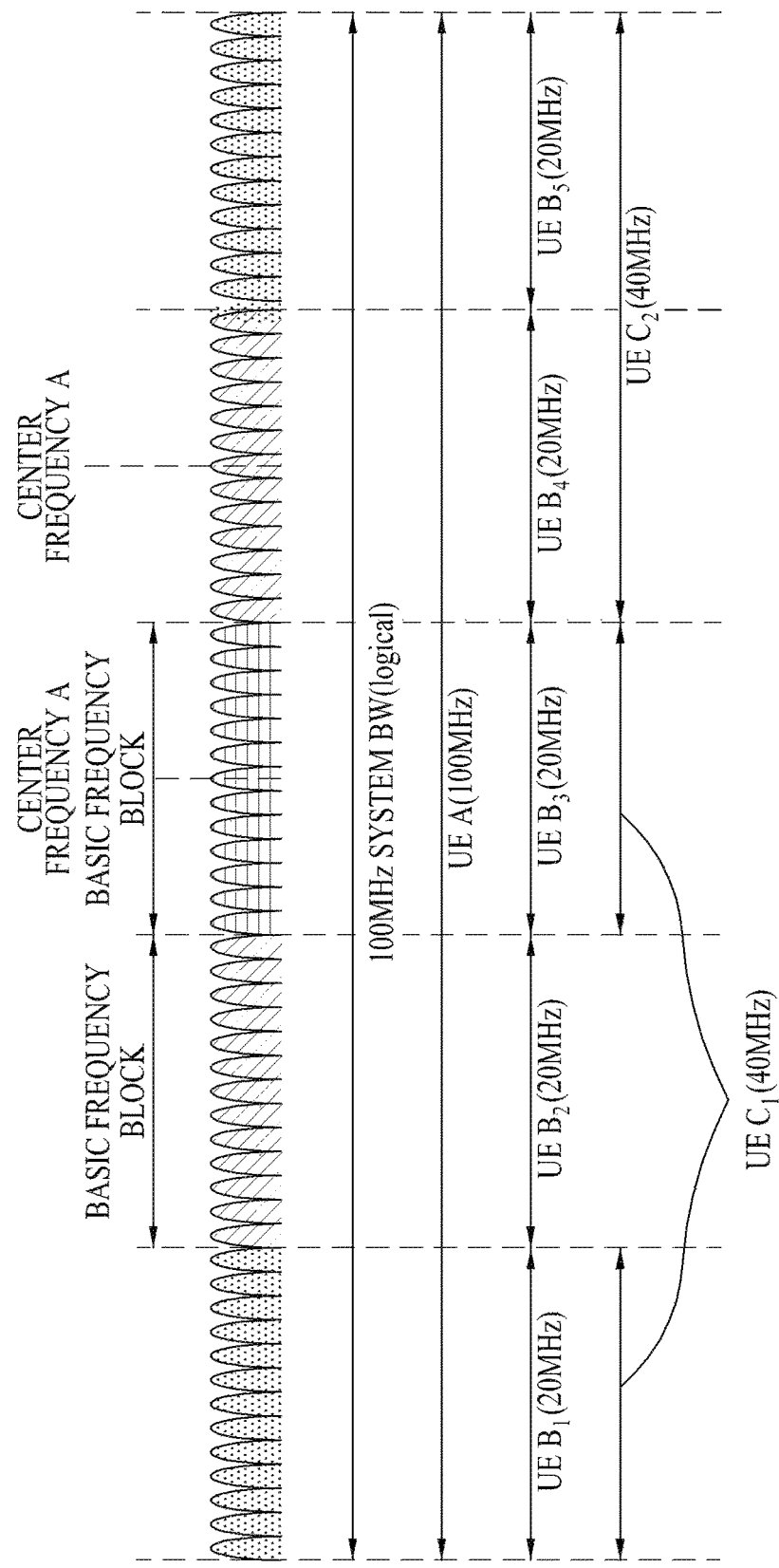
FIG. 8 is a view illustrating concept of a carrier aggregation scheme.

Hereinafter, a carrier aggregation scheme will be described. FIG. 8 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will be consistently used.

Referring to FIG. 8, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 8 illustrates the case in which component carriers have the same bandwidth, the case is purely exemplary, and thus, the component carriers may have different bandwidths. In addition, although FIG. 8 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 8. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

Recently, a wireless communication system considers adopting an active antenna system (AAS). Unlike the existing passive antenna system in which an amplifier and antenna capable of adjusting a phase and size of a signal are separated from each other, the AAS means a system configured in a manner that each antenna is configured to include an active device such as an amplifier. As the active antenna is used, the AAS does not need a separate cable, connector, other hardware and the like to connect an amplifier and an antenna together. Hence, the AAS has the feature of high efficiency in aspects of energy and management cost. Particularly, since the AAS supports an electronic beam control scheme per antenna, it enables advanced MIMO technologies such as elaborate beam pattern formation, 3D beam pattern formation and the like in consideration of beam direction and width.

Owing to the introduction of the advanced antenna system such as AAS and the like, a massive MIMO structure having multiple input output antennas and a multi-dimensional antenna structure is considered as well. For example, in case of forming a 2D antenna array unlike an existing straight antenna array, it is able to form a 3D beam pattern by an active antenna of AAS.

Figure 9:
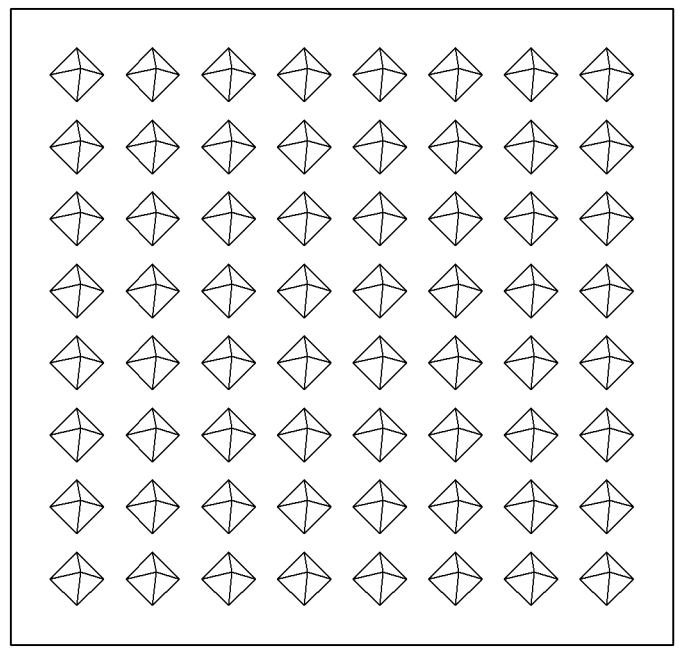
FIG. 9 is a diagram illustrating an example of a 2D active antenna system having 64 antenna elements.

FIG. 9 is a diagram illustrating an example of a 2D active antenna system having 64 antenna elements.

Referring to FIG. 9, it can be observed that $N_t$ ($=N_v \cdot N_h$) antennas configure a square shape. Particularly, $N_h$ indicates the number of horizontal antenna columns and $N_t$ indicates the number of vertical antenna rows.

In viewpoint of a transmitting antenna, in case of utilizing the 3D beam pattern, it is able to perform quasi-static or dynamic beamforming in a vertical direction as well as in a horizontal direction. For example, it is able to consider application of vertical sector formation and the like. Moreover, in viewpoint of a receiving antenna, in case of forming a receiving beam using a massive antenna, it is able to expect a signal power ascending effect according to an antenna array gain. Therefore, in case of uplink, a base station can receive a signal transmitted from a UE through multiple antennas. In doing so, it is advantageous in that the UE can set its transmit power to a very low level by considering a gain of a massive receiving antenna to reduce interference influence.

If the 2D-AAS is introduced, in order to inform a receiving end of a channel from a transmitting end to the receiving end, the transmitting end should send specific RS, e.g., CSI-RS. In the current LTE system, such CSI-RS is designed as 1-, 2-, 4- or 8-antenna port CSI-RS. Each n-port CSI RS should use n REs in 1 RB, where n>1. Hence, in case of 2D-AAS, if there are total 64 antennas including 8 antennas in a vertical direction and 8 antennas in a horizontal direction, 64 REs in 1 RB should be used for CSI-RS. Hence, it may cause a problem of CSI-RS overhead due to the number of antennas.

Moreover, as the number of antennas increases, so does CSI feedback overhead. And, in order for a UE to feed back CSI information having a larger payload size through PUCCH, there is ongoing discussion about a preferable use of which PUCCH format. Capacity of PUCCH format 3 has increased up to maximum 22 bits, whereas the existing PUCCH format 2 has capacity of transmitting payload of maximum 13 bits per subframe.

First Embodiment—PUCCH Format 3

According to a first embodiment of the present invention, as discussed above, a case of using PUCCH format 3 as 2D-AAS response feedback is described.

In the current LTE-A standard document, a UE uses PUCCH format 3 for the usage of ACK/NACK feedback for DL data. Although the UE has sent maximum 2-bit ACK/NACK information to a base station through PUCCH format 1a/1b, as TDD system and CA environment are established, overhead of ACK/NACK information increases and PUCCH format 3 of a larger capacity is introduced to resolve the increasing overhead.

For example, in case of UL/DL subframe configuration #2 in the TDD system mentioned in Table 2, since a ratio of UL subframe to DL subframe is 1:4 that is asymmetric, ACK/NACK information corresponding to 4 DL subframes should be reported in a single UL subframe. Moreover, in case that CA for n CCs is applied, ACK/NACK information corresponding to maximum 4n DL subframes should be reported in a single UL subframe. Namely, in case of 5 CC CA, ACK/NACK information corresponding to 20 DL subframes should be reported.

Although ACK/NACK information on two codewords simultaneously transmitted in a single frame is reported in manner of compressing 2-bit information into 1-bit by spatial bundling, if 5CC CA is applied for UL/DL subframe configuration #2, maximum 20-bit ACK/NACK information should be reported through a single UL subframe. As a result, PUCCH format 3 having maximum 22-bit capacity is defined and a base station can inform a UE whether the PUCCH format 3 is used through RRC signaling.

If CSI feedback periodically transmitted in PUCCH format 3 and ACK/NACK report of PUCCH format 3 collide with each other in a single UL subframe, if a margin capacity of PUCCH 3 resulting from excluding ACK/NACK payload (if SR information exists, a bit of a payload size of the SR information is included) from total 22-bit capacity of PUCCH 3 is equal to or greater than a CSI payload size, ACK/NACK and CSI are simultaneously transmitted through PUCCH 3. Otherwise, CSI is not transmitted (i.e., CSI is dropped) but ACK/NACK is transmitted only.

For an ACK/NACK report for DL data, PUCCH format 3 is configured to be used. If CSI of a large capacity is periodically reported through PUCCH format 3, the following problems 1) and 2) may be caused.

Problem 1)

If a CSI feedback timing and an ACK/NACK transmission timing overlap with each other (i.e., a case that CSI and ACK/NACK collide with each other), a base station is unable to know a presence or non-presence of ACK/NACK information in PUCCH 3 transmitted by a UE. As a result, the base station is unable to perform PUCCH 3 decoding correctly.

Figure 10:
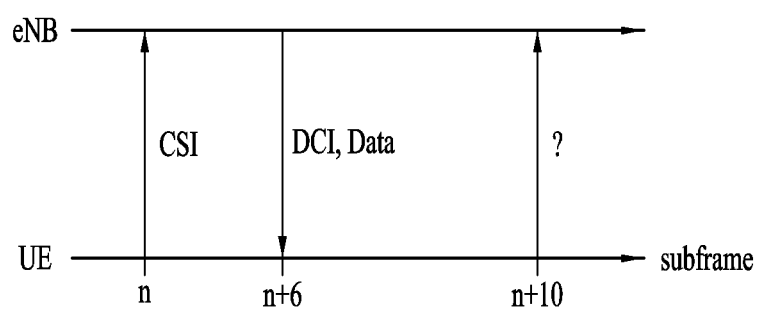
FIG. 10 is a diagram illustrating an ACK/NACK reporting process of CSI feedback and downlink data between a base station and a user equipment.

FIG. 10 shows an ACK/NACK reporting process of CSI feedback and downlink data between a base station and a user equipment. Particularly, FIG. 10 is a diagram showing a case that a CSI feedback timing and an ACK/NACK transmission timing overlap with each other.

Referring to FIG. 10, a CSI feedback period is 10 ms and starts from subframe #n. And, it can be observed that DL data is transmitted in subframe #(n+6). ACK/NACK information on such DL data is set to be transmitted in subframe #(n+10) after 4 ms from a reception timing. As a result, a collision between CSI and ACK/NACK occurs in the subframe #(n+10).

As described above, when a collision between CSI using PUCCH format 2 and ACK/NACK using PUCCH format 3 occurs, if there remains a capacity capable of additionally carrying CSI besides ACK/NACK payload carried on PUCCH format 3, both of the ACK/NACK and the CSI are transmitted on PUCCH format 3. Otherwise, the CSI is dropped but the ACK/NACK is transmitted only.

Like subframe #(n+10) of FIG. 10, when a collision between CSI using PUCCH format 2 and ACK/NACK using PUCCH format 3 occurs, it is able to define a UE operation by extending an operation of an existing LTE-A system. Namely, if there remains a capacity capable of additionally carrying CSI besides ACK/NACK payload carried on PUCCH format 3, both of the ACK/NACK and the CSI are transmitted on PUCCH format 3. Otherwise, the CSI is dropped but the ACK/NACK is transmitted only. According to such a UE operation, the base station can be aware that, if a collision between CSI and ACK/NACK occurs, the ACK/NACK is always transmitted and that the CSI is additionally transmitted on a condition that a remaining PUCCH 3 capacity is sufficient.

Yet, since the UE fails in BD (behind detection) of DCI in subframe #(n+6) and determines that DL data is not transmitted, it causes a problem. Namely, since there is no ACK/NACK to be transmitted in subframe #(N+10), the UE transmits SCI only through PUCCH 3. Since the base station is not aware that the UE has failed in BD of DCI in the subframe #(n+6), the base station expects an ACK/NACK reception in the subframe #(n+10). Eventually, as the base station regards a CSI payload carried on PUCCH as an ACK/NACK payload, it fails in both CSI decoding and ACK/NACK decoding. Moreover, since CRC does not exist in information transmitted through PUCCH 3, the base station is unable to know a decoding success/failure.

In order to solve the aforementioned problem 1), a first embodiment of the present invention proposes that a UE reports a 1-bit ANE (ACKNACK Existence) indicator indicating a presence or non-presence of ACK/NACK information at a PUCCH CSI feedback timing. Namely, the UE transmits 1-bit ANE together with a transmission of PUCCH format 3 in the subframe #n and the subframe #(n+10) shown in FIG. 10.

As the UE succeeds in DCI BD in subframe #(n+6), if the UE decodes DL data, it indicates that ACKNACK information exists in PUCCH format 3 by setting 'ANE=1' in subframe #(n+10). In doing so, a presence or non-presence of CSI is determined according to a capacity of PUCCH format 3 remaining except ACKNACK information. If the base station and the UE calculate the remaining capacity of PUCCH format in the same manner, it is not necessary to signal a presence or non-presence of CSI. Of course, if the base station and the UE differ from each other in ACK-NACK payload size calculation, the UE can additionally signal a presence or non-presence of CSI.

If the UE fails in DCI BD in subframe #(n+6), it indicates that ACKNACK information does not exist in PUCCH format 3 by setting 'ANE=0' in subframe #(n+10). In this case, since the UE obtains that there is no ACKNACK information to be sent, the UE feeds back CSI only in PUCCH format 3.

The ANE information can be transmitted using DM-RS (demodulation reference signal) transmitted on RB that caries PUCCH format 3. In PUCCH format 2a or PUCCH format 2b defined in the current LTE-A system, when a collision between CSI and ACKNACK occurs, the two informations are sent by being carried on a single RB. Namely, 1- or 2-bit ACKNACK information is transmitted using DM-RS existing in OFDM symbols #1 and #5 (counting from OFDM symbol 0) and CSI is transmitted in PUCCH format 2 using the remaining RBs.

In the same manner as above, ANE information is transmitted using DM-RS existing in OFDM symbols #1 and #5 of each slot of an RB on which PUCCH format 3 is transmitted. The base station obtains the ANE information using the DM-RS received in subframe #(n+10). If ANE is 0, the base station performs decoding on the assumption that only CSI exists in PUCCH 3. As described above, if ANE is 1, the base station additionally obtains a presence or non-presence of CSI and then performs decoding on ACKNACK and CSI.

Figure 11:
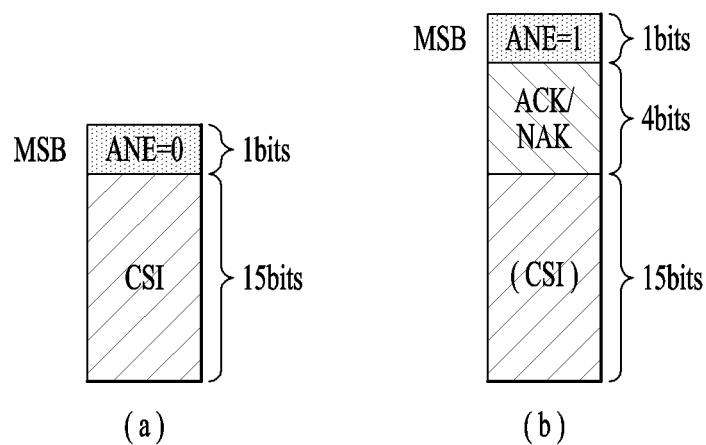
FIG. 11 is a diagram illustrating one example of payload configuration of PUCCH format 3 according to a first embodiment of the present invention.

In another manner, the ANE information may be transmitted by being carried on PUCCH format 3 together. FIG. 11 is a diagram illustrating one example of payload configuration of PUCCH format 3 according to a first embodiment of the present invention. Particularly, FIG. 11 shows a configuration of payload transmitted in PUCCH format 3 in subframe #(n+10).

Referring to FIG. 11, it can be observed that an ANE value is transmitted on MSB (most significant bit) of payload of PUCCH format 3. As PUCCH format 3 is channel-encoded using RM (Reed-Muller) block coding, since PUCCH format 3 is characterized in that MSB is coded most strongly, the most significant ANE value is disposed on the MSB.

If ANE=0, as shown in FIG. 11 (*a*), CSI configures the remaining payload. Assuming that CSI is configured with 15 bits, a total payload size transmitted through PUCCH format 3 is configured with 16 bits. If ANE=1, as shown in FIG. 11 (*b*), ACK/NACK exists in PUCCH format 3 and CSI is determined according to the remaining PUCCH capacity. Since ACK/NACK information is 4 bits in FIG. 11 (*b*), 15-bit CSI is transmitted together. Eventually, a total payload size transmitted through PUCCH format 3 is configured with 20 bits.

In case that a payload size transmitted in PUCCH format 3 varies according to an ANE value, as shown in FIG. 11, a base station should perform BD by assuming the payload in case of ANE=0 and the payload in case of ANE=1, respectively. If the base station fails in BD, the base station is unable to decode ACK/NACK and CSI correctly. Moreover, since there is no CRC, the base station is unable to verify a decoding result. Hence, it is able to additionally consider a scheme not depending on BD of a base station as well as the scheme shown in FIG. 11.

Figure 12:
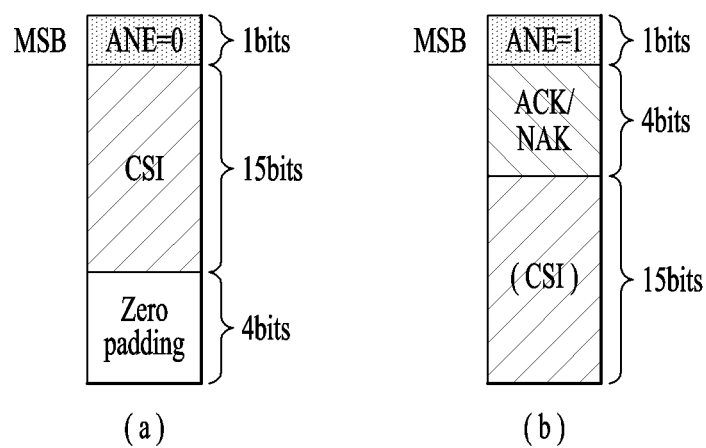
FIG. 12 is a diagram illustrating another example of payload configuration of PUCCH format 3 according to a first embodiment of the present invention.

FIG. 12 is a diagram illustrating another example of payload configuration of PUCCH format 3 according to a first embodiment of the present invention. Particularly, FIG. 12 shows that a payload size transmitted in PUCCH format 3 can be operated by being fixed irrespective of an ANE value.

Referring to FIG. 12, it can be observed that, in order to fix a payload size with reference to a larger one of a payload size required for a case of ANE=0 and a payload size required for a case of ANE=1, zero padding is used for a case that the payload size is small. For example, FIG. 12 (*a*) shows that, in order to match a 20-bit payload size of FIG. 12 (*b*), 4 bits are zero-padded. As a result, a base station attempts decoding to match the 20-bit payload size and may interpret the remaining bits as CSI or ACK/NACK according to an ANE value.

Problem 2)

Meanwhile, although a collision between CSI and ACK/NACK has occurred, since a payload size sum of two informations exceeds 22 bits, if it is unable to transmit the two informations through a single PUCCH format 3, a UE is unable to transmit CSI. For example, if the UE receives UL/DL subframe configuration #1 and configuration of CA for 5 CCs, ACK/NACK information transmittable maximally in a single UL subframe is 20 bits or 10 bits.

Figure 13:
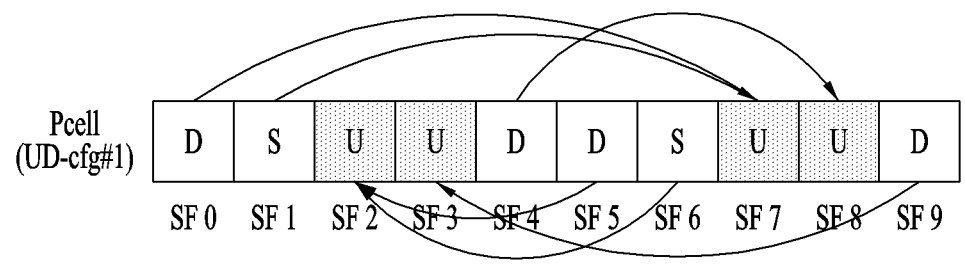
FIG. 13 is a diagram illustrating an example of ACK/NACK feedback scheme in uplink/downlink subframe configuration #1.

FIG. 13 is a diagram illustrating an example of ACK/NACK feedback scheme in uplink/downlink subframe configuration #1. Namely, FIG. 13 shows that ACK/NACK for DL subframe and special subframe in UL/DL subframe configuration #1 is transmitted through which UL subframe.

Referring to FIG. 13, UL subframes of subframe #2 and subframe #7 can be used for the usage of transmitting ACK/NACK information for data received in 2 DL subframes, respectively. And, UL subframes of subframe #3 and subframe #8 can be used for the usage of transmitting ACK/NACK information for data received in a single DL subframe, respectively.

Namely, the ACK/NACK information transmitted in the UL subframes of subframe #2 and subframe #7 is 20 bits calculated by 2 (subframes)*5 (CCs)*2 (codewords). And, the ACK/NACK information transmitted in the UL subframes of subframe #3 and subframe #8 is 10 bits calculated by 1 (subframe)*5 (CCs)*2 (codewords).

Additionally, in a current LTE-A system, a spatial bundling scheme can be used to reduce an ACK/NACK payload size. In this case, ACK/NACK information transmitted in UL subframes of subframe #2 and subframe #7 is reduced into 10 bits calculated by 2 (subframes)*5 (CCs)*1. And, ACK/NACK information transmitted in UL subframes of subframe #3 and subframe #8 is reduced into 5 bits calculated by 1 (subframe)*5 (CCs)*1.

Eventually, assuming that CSI is 15 bits, although spatial bundling is applied, a sum of CSI and ACK/NACK informations is 25 bits (=15+10) in UL subframes of subframe #2 and subframe #7, thereby exceeding the capacity of PUCCH format 3. In this case, it causes a problem that a UE is unable to transmit CSI.

In order to solve the problem 2), the UE reduces 15-bit payload into transmittable 10 bits through CSI sub-sampling in UL subframes of subframe #2 and subframe #7 of FIG. 13 and is then able to transmit the 10-bit CSI through PUCCH format 3 together with ACK/NACK, which is incomplete in two aspects as follows.

First of all, if CSI is reduced into 10 bits, accuracy of the CSI is lowered. As a result, since an optimal UE scheduling is not possible, a DL transmission speed is lowered. Secondly, as an ACK/NACK payload size is further increased according to UL/DL subframe configuration, the remaining capacity of PUCCH format 3 except ACK/NACK may be considerably small. For example, if 5 CCs are configured in UL/DL subframe configuration #2, although spatial bundling is applied, 20-bit ACK/NACK information is generated. In this case, although the remaining capacity of PUCCH format 3 is 2 bits only, a problem solution through CSI subsampling is not possible.

Therefore, the present invention proposes that a UE can apply additional bundling as well as spatial bundling and signal a presence or non-presence of application of the additional bundling or an additional bundling applying scheme together with PUCCH format 3.

Particularly, the UE can select and apply one of various bundling patterns, thereby adjusting a payload size of CSI information loadable together with PUCCH format 3. For example, a base station and a UE agree that only spatial bundling applies to bundling pattern 0 and also agree that spatial bundling and subframe bundling simultaneously apply to bundling pattern 1. Here, the subframe bundling means a method of when a report of ACK/NACK for multiple subframes is connected to a single UL subframe, sending a single ACK as a representative value if the bundled multiple subframes are all ACK, or, otherwise, sending a single NACK as a representative value. An ACK/NACK payload size required for subframe #2 (or, subframe #7) is 10 bits in case of using the bundling pattern 0 or 5 bits in case of using the bundling pattern 0.

When the bundling pattern 1 is applied, if DL resource waste according to ACK/NACK information compression is considerable, the UE applies the bundling pattern 0, and sends CSI by subsampling the CSI according to the remaining capacity of PUCCH format 3, or does not send CSI. For example, only if the remaining capacity of PUCCH format 3 except ACK/NACK information is equal to or greater than K bits, CSI is subsampled and then sent together with ACK/NACK. Otherwise, CSI is not sent.

When the bundling pattern 1 is applied, if DL resource waste according to ACK/NACK information compression is not considerable, the UE applies the bundling pattern 1 and sends non-subsampled 15-bit CSI together with ACK/NACK.

It is possible to define other bundling patterns additionally. For example, an additional bundling pattern may be defined as simultaneously applying spatial bundling and CC (component carrier) bundling. Here, the CC bundling means a method of when a report of ACK/NACK for multiple CCs is connected to a single UL subframe, sending a single ACK as a representative value if the bundled multiple CCs are all ACK, or, otherwise, sending a single NACK as a representative value. Particularly, it is able to define that ACKs/NACKs of 4 of 5 CCs are CC-bundled and that CC bundling is not applied to the remaining CC. The number of cases of selecting a CC to which CC bundling is not applied from 5 CCs is 5 as follows. For clarity, the additional bundling patterns are named bundling patterns 2 to 6.

Bundling pattern 2—Apply spatial bundling to CC0 only. Apply both spatial bundling and CC bundling to the remaining CCs.

Bundling pattern 3—Apply spatial bundling to CC1 only. Apply both spatial bundling and CC bundling to the remaining CCs.

Bundling pattern 4—Apply spatial bundling to CC2 only. Apply both spatial bundling and CC bundling to the remaining CCs.

Bundling pattern 5—Apply spatial bundling to CC3 only. Apply both spatial bundling and CC bundling to the remaining CCs.

Bundling pattern 6—Apply spatial bundling to CC4 only. Apply both spatial bundling and CC bundling to the remaining CCs.

Eventually, 5 types of CC bundling patterns can be additionally defined. And, the bundling pattern can be signaled with total 3 bits by being combined with the bundling pattern 0 and the bundling pattern 1.

It is able to find various trade-off points between CSI accuracy according to a bundling pattern and DL resource waste according to ACK/NACK information compression. Bundling pattern determination may completely depend on UE implementation. Or, after providing a condition for selecting a bundling pattern, a UE can determine a bundling pattern according to the condition. For example, it is able to provide a condition for selecting a bundling pattern like "if CC #i among 5 CCs configured for a UE is activated only and the rest of CCs are deactivated all, apply bundling pattern #(i+2)".

A bundling pattern value is transmitted to a base station by a UE. Like the ANE value transmitting scheme, this value can be transmitted by utilizing DM-RS transmitted together with PUCCH format 3 or being carried within PUCCH format 3 together. If the bundling pattern value is transmitted by being carried within PUCCH format 3 together and a payload size of PUCCH format 3 varies according to a bundling pattern, it may be difficult for the base station to decode PUCCH format 3. Hence, in this case, it is preferable that the payload size is maintained irrespective of the bundling pattern. If the payload size is decreased, it is able to maintain the payload size through zero padding.

Figure 14:
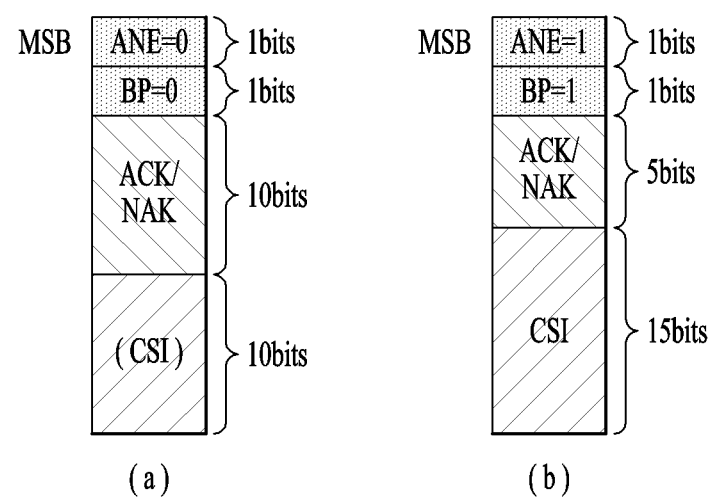
FIG. 14 is a diagram illustrating further example of payload configuration of PUCCH format 3 according to a first embodiment of the present invention.

FIG. 14 is a diagram illustrating further example of payload configuration of PUCCH format 3 according to a first embodiment of the present invention. Particularly, FIG. 14 shows a payload configuration of PUCCH format 3 transmitted by a UE when 5CC CA is configured and a collision between ACK/NACK and CSI occurs in subframe #2 or subframe #7 shown in FIG. 13.

BP=0 and BP=1 indicate the above-defined bundling pattern 0 and the above-defined bundling pattern 1, respectively. According to the BP value, a payload weight of ACK/NACK is different from that of CSI. In FIG. 14 (a), as bundling pattern 0 is applied, ACK/NACK is 10 bits and the remaining 10 bits is usable for subsampled CSI transmission. Regarding whether to use the remaining 10 bits for CSI transmission, only if it is K bits or more with reference to a pre-defined K value, it is able to define to use the remaining 10 bits for CSI transmission. In FIG. 14 (b), as bundling pattern 1 is applied, ACK/NACK is 5 bits and the remaining 15 bits (without performing subsampling) is usable for CSI transmission.

Additionally, in order to prevent collision between ACK/NACK information and CSI, PUCCH format 3 for ACK/NACK transmission and PUCCH format 3 for CSI transmission can be configured by a base station for a UE in a manner of being distinguished from each other. Although a transmitting timing of the ACK/NACK information collides with that of the CSI, the UE can simultaneously transmit the corresponding information using the two PUCCH format 3.

Second Embodiment—PUCCH Format 2

According to a second embodiment of the present invention, a case of using PUCCH format 2 as 2D-AAS response feedback is described.

As a CSI information size increases, it may be preferable that all 13 bits corresponding to a maximum payload size of PUCCH format 2 are used for CSI transmission in case of a normal CP. Yet, in case of an extended CP, it is impossible to further assign a payload size for CSI due to ACK/NACK transmitted simultaneously with CSI. Hence, in case that CSI and ACK/NACK are simultaneously transmitted in an extended CP, the following operations (1) to (3) are proposed.

Operation (1)

A base station and a UE can agree not to use a new codebook for periodic PUCCH feedback in an extended CP. As a size of a new codebook increases, if a feedback size including PMI exceeds 11 bits, the UE uses an existing codebook designed not to exceed 11 bits instead of using the new codebook.

Of course, as ACK/NACK is not generated, if simultaneous transmission of ACK/NACK and CSI does not occur, a new codebook can be used. As a result, since a new codebook is always used in a normal CP, a more elaborate PMI feedback is possible. Yet, in an extended CP, if simultaneous transmission of ACK/NACK and CSI occurs, an existing codebook is used.

Figure 15:
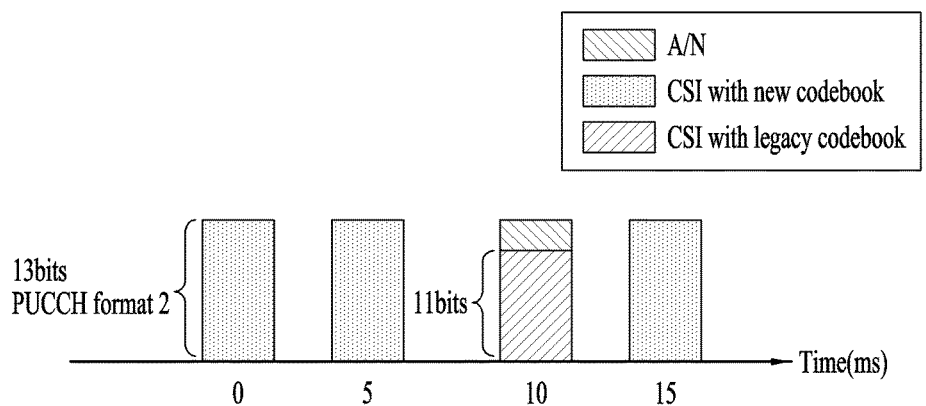
FIG. 15 is a diagram illustrating one example of reporting channel state information and ACK/NACK according to a second embodiment of the present invention.

FIG. 15 is a diagram illustrating one example of reporting channel state information and ACK/NACK according to a second embodiment of the present invention. Particularly, in FIG. 15, a reporting period of CSI is set to 5 ms and ACK/NACK transmission is performed at a timing of 10 ms. Hence, it can be observed that simultaneous transmission of ACK/NACK and CSI occurs.

In such a case, a UE performs feedback by falling back to an existing codebook having a small codebook size, thereby performing simultaneous transmission of ACK/NACK and CSI through PUCCH format 2 within total 13 bits. Although an existing codebook is still usable at the remaining CSI report timing, it can be observed from FIG. 15 that more elaborate feedback is performed using a new codebook.

Operation (2)

Or, a base station and a UE agree to use a new codebook for periodic PUCCH feedback in an extended CP by subsampling the new codebook (or, if subsampling is used in a normal CP, to use subsampling, which is stronger than that in the normal CP, in an extended CP).

As a size of a new codebook increases, if a feedback size including PMI exceeds 11 bits, the UE uses a new codebook not to exceed 11 bits by subsampling the new codebook. Of course, as ACK/NACK is not generated, if simultaneous transmission of ACK/NACK and CSI does not occur, the new codebook can be used without subsampling or with slight subsampling. As a result, in a normal CP, as a new codebook is always used, more elaborate PMI feedback is possible. Yet, in an extended CP, if simultaneous transmission of ACK/NACK and CSI occurs, a codebook to which strong subsampling is applied is used.

Figure 16:
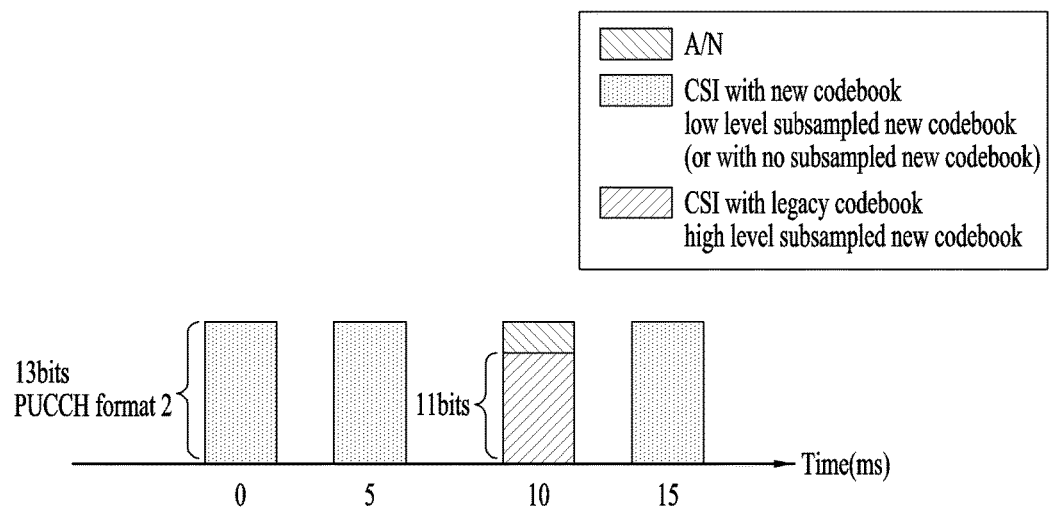
FIG. 16 is a diagram illustrating another example of reporting channel state information and ACK/NACK according to a second embodiment of the present invention.

FIG. 16 is a diagram illustrating another example of reporting channel state information and ACK/NACK according to a second embodiment of the present invention. Likewise, in FIG. 16, a reporting period of CSI is set to 5 ms and ACK/NACK transmission is performed at a timing of 10 ms, whereby simultaneous transmission of ACK/NACK and CSI occurs.

In this case, a UE performs feedback by subsampling a new codebook, thereby performing simultaneous transmission of ACK/NACK and CSI through PUCCH format 2 within total 13 bits. Although the same subsampling applied codebook is still usable at the remaining CSI report timing having no ACK/NACK, it can be observed from the example of FIG. 15 that more elaborate feedback is performed using a new codebook without subsampling or with weak subsampling.

Operation (3)

In the aforementioned operation (1) and operation (2), if simultaneous transmission of ACK/NACK and CSI occurs, a UE performs the simultaneous transmission through PUCCH 2. Yet, in the operation (3), if a new codebook is configured in case of an extended CP, it is proposed to disable the simultaneous transmission of ACK/NACK and CSI. Namely, if a new codebook is configured in case of an extended CP, the UE expects that a base station will signal the UE to disable the simultaneous transmission of ACK/NACK and CSI. As a result, if a transmission timing of ACK/NACK meets that of CSI at the timing of 10 ms shown in FIG. 15 or FIG. 16, the UE reports the ACK/NACK only but drops the CSI.

Figure 17:
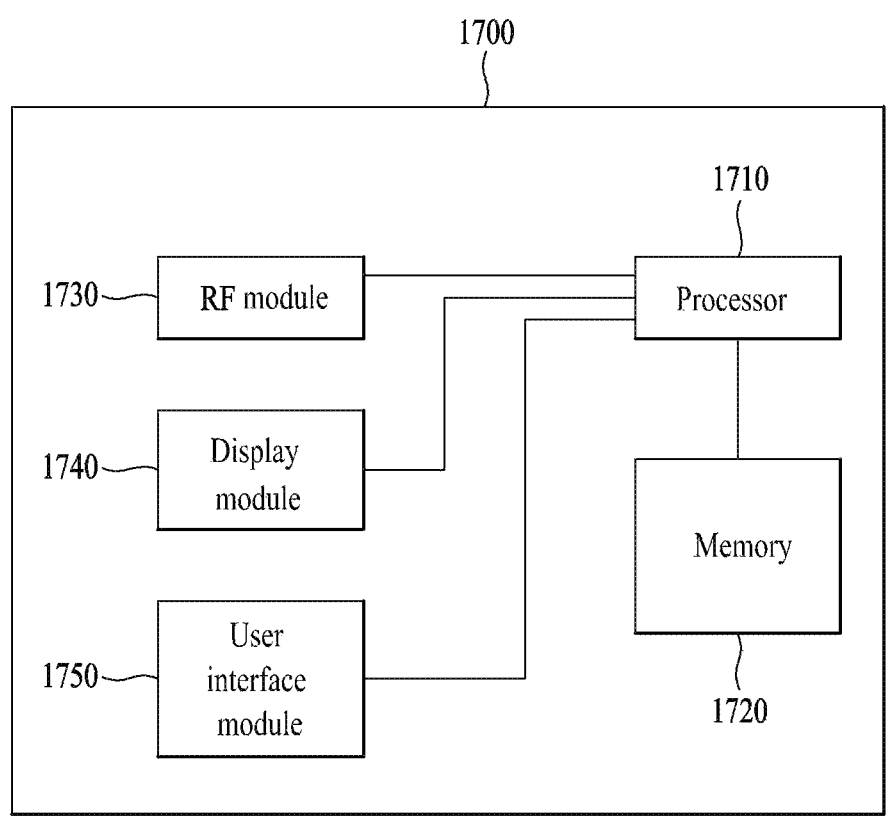
FIG. 17 is a block diagram of a communication apparatus according to one embodiment of the present invention.

FIG. 17 is a block diagram of a communication apparatus according to an embodiment of the present invention.

Referring to FIG. 17, the communication device 1700 includes a processor 1710, a memory 1720, an RF module 1730, a display module 1740, and a user interface module 1750.

The communication device 1700 is illustrated for convenience of description and some modules may not be omitted. The communication device 1700 may further include necessary modules. In addition, some modules of the communication device 1700 may be subdivided. The processor 1710 is configured to perform operations according to the embodiment of the present invention that is exemplified with reference to the diagrams. In detail, a detailed operation of the processor 1710 would be understood with reference to FIGS. 1 to 16.

The memory 1720 is connected to the processor 1710 and stores an operating system, an application, a program code, data, etc. The RF module 1730 is connected to the processor 1710 and converts a baseband signal into a radio signal or converts a radio signal into a baseband signal. To this end, the RF module 1730 performs analog conversion, amplification, filtering, and frequency up-conversion, or inverse procedures thereof. The display module 1740 is connected to the processor 1710 and displays various pieces of information. The display module 1740 may use, but is not limited to, well-known elements such as a liquid crystal display (LCD), a light emitting diode (LED), and an organic light emitting diode (OLED). The user interface module 1750 may be connected to the processor 1710 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, 'base station (BS)' may be substituted with such a terminology as a fixed station, a Node B, an eNode B (eNB), an advanced base station (ABS), an access point (AP) or the like.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method and apparatus for reporting channel state information in a wireless communication system are described centering on examples applying to 3GPP LTE system, they are applicable to various wireless communication systems as well as to 3GPP LTE system.

What is claimed is:

1. A method of transmitting uplink control information to a base station from a user equipment in a wireless communication system, comprising:
    transmitting a first uplink control information including channel state information to the base station periodically; and
    transmitting a second uplink control information including response information to downlink data to the base station,
    wherein if the first uplink control information and the second uplink control information are transmitted at a same timing, the channel state information is included in the second uplink control information and
    wherein the first uplink control information and the second uplink control information are transmitted together with a first indicator indicating whether the response information is included.

2. The method of claim 1, wherein the first uplink control information and the second uplink control information include a second indicator indicating a bundling pattern applied to the response information.

3. The method of claim 1, wherein if a remaining capacity amounting to a size of the channel state information exists in the second uplink control information, the channel state information is included in the second uplink control information.

4. The method of claim 1, wherein if a remaining capacity amounting to a size of the channel state information does not exist in the second uplink control information, the channel state information is dropped.

5. The method of claim 1, wherein the first indicator is included in a reference signal transmitted together with the first uplink control information and the second uplink control information.

6. The method of claim 1, wherein MSB (most significant bit) in payload of the first uplink control information and the second uplink control information is the first indicator.

7. The method of claim 1, wherein a size of the first uplink control information is equal to that of the second uplink control information.

8. A user equipment in a wireless communication system, comprising:
    a wireless communication module configured to transceive a signal with a base station; and
    a processor configured to process the signal,
    wherein the processor is further configured to control the wireless communication unit to transmit a first uplink control information including channel state information to the base station periodically and to transmit a second uplink control information including response information to downlink data to the base station,
    wherein if the first uplink control information and the second uplink control information are transmitted at a same timing, the processor controls the channel state information to be included in the second uplink control information and
    wherein the first uplink control information and the second uplink control information are transmitted together with a first indicator indicating whether the response information is included.

9. The user equipment of claim 8, wherein the first uplink control information and the second uplink control information include a second indicator indicating a bundling pattern applied to the response information.

10. The user equipment of claim 8, wherein if a remaining capacity amounting to a size of the channel state information exists in the second uplink control information, the processor controls the channel state information to be included in the second uplink control information.

11. The user equipment of claim 8, wherein if a remaining capacity amounting to a size of the channel state information does not exist in the second uplink control information, the processor drops the channel state information.

12. The user equipment of claim 8, wherein the first indicator is included in a reference signal transmitted together with the first uplink control information and the second uplink control information.

13. The user equipment of claim 8, wherein MSB (most significant bit) in payload of the first uplink control information and the second uplink control information is the first indicator.

14. The user equipment of claim 8, wherein a size of the first uplink control information is equal to that of the second uplink control information.

* * * * *